United States Patent [19]

Knecht et al.

[11] Patent Number: 4,802,561
[45] Date of Patent: Feb. 7, 1989

[54] ADJUSTABLE SHOCK ABSORBER

[75] Inventors: Heinz Knecht; Norbert Ackermann, both of Eitorf, Fed. Rep. of Germany

[73] Assignee: Boge AG, Eitorf, Fed. Rep. of Germany

[21] Appl. No.: 24,831

[22] Filed: Mar. 12, 1987

[30] Foreign Application Priority Data

Mar. 22, 1986 [DE] Fed. Rep. of Germany ....... 3609862

[51] Int. Cl.⁴ .................... B60G 17/08; F16F 9/50
[52] U.S. Cl. .................... 188/318; 188/322.13; 188/322.14; 188/299
[58] Field of Search .............. 188/322.14, 322.13, 188/315, 318, 299, 322.22, 322.15, 310, 317, 319; 251/30.02, 30.05, 45, 61.1

[56] References Cited

U.S. PATENT DOCUMENTS

| | | | |
|---|---|---|---|
| 3,621,950 | 11/1971 | Lutz | 188/318 |
| 3,807,678 | 4/1974 | Karnopp et al. | 188/299 |
| 4,179,096 | 12/1979 | Fromfield | 251/30.05 |
| 4,491,207 | 1/1985 | Boonchanta et al. | 188/299 |
| 4,545,769 | 10/1985 | Nakahama et al. | 188/299 |
| 4,660,689 | 4/1987 | Hayashi et al. | 188/322.13 |

FOREIGN PATENT DOCUMENTS

| | | |
|---|---|---|
| 1066828 | 10/1959 | Fed. Rep. of Germany ... 251/30.02 |
| 1242945 | 6/1967 | Fed. Rep. of Germany . |
| 2119531 | 11/1971 | Fed. Rep. of Germany . |
| 3334704 | 4/1985 | Fed. Rep. of Germany . |
| 629970 | 10/1949 | United Kingdom ........... 188/318 |

Primary Examiner—Andres Kashnikow
Assistant Examiner—Mark T. Le
Attorney, Agent, or Firm—Nils H. Ljungman

[57] ABSTRACT

Adjustable shock absorber, particularly for motor vehicles, which includes a cylinder containing damping fluid, an axially-movable piston rod which projects in a sealed manner into the cylinder, and a piston fastened to the rod and dividing the cylinder chamber into two working chambers interconnected by at least one passage which produces a damping force, the effective cross section of which can be adjusted by means of a throttle valve. The bypass includes a flexible membrane enclosed in a chamber such that on the one side of the membrane, there is at least one inflow passageway and at least one outflow passageway of the passage which can be sealed off from one another by the membrane, a control edge (or valve seat) which interacts with the membrane, and on the other side of the membrane, a control chamber carrying a control bypass flow and sealed off from the passage.

29 Claims, 5 Drawing Sheets

ADJUSTABLE SHOCK ABSORBER

CROSS-REFERENCES TO CO-PENDING APPLICATIONS

Co-pending application Ser. No. 735,452, filed on May 17, 1985, entitled "Adjustable Hydraulic Shock Absorber", which corresponds to Federal Republic of Germany Application No. P 34 18 262.4, filed May 17, 1984; co-pending application Ser. No. 778,606 filed on Sept. 20, 1985, entitled "Hydraulic Adjustable Shock Absorber", which corresponds to Federal Republic of Germany Application No. P 34 34 877.8, filed Sept. 22, 1984, for which U.S. application the issue fee was paid for on Nov. 3, 1986; co-pending application Ser. No. 772,316 filed on Sept. 4, 1985, entitled "Hydraulic Vibration Damper Having Adjustable Damping Valve", which corresponds to Federal Republic of Germany Application No. P 34 32 465.8, filed Sept. 4, 1984; co-pending application Ser. No. 864,451 filed on May 16, 1986, entitled "Adjustable Hydraulic Vibration Damper", which corresponds to Federal Republic of Germany Application No. P 35 18 327.6, filed May 22, 1985; and co-pending application Ser. No. 915,265, filed on Oct. 3, 1986, entitled "A Vibration Damper for Motor Vehicles Having an Arrangement for Varying Damping Thereof", which corresponds to Federal Republic of Germany Application No. P 35 35 287.6, filed Oct. 3, 1985, all of which are assigned to at least one of the same assignees as the instant application, are incorporated herein by reference as if the texts thereof were fully set forth herein.

Additionally, issued U.S. Pat. Nos. 4,635,765, issued Jan. 13, 1987, entitled "Adjustable Hydraulic Damper Apparatus" and 4,577,840, issued Mar. 25, 1986, entitled "Self-pumping Hydropneumatic Spring Leg or Strut With Internal Level Control For Motor Vehicles", both relate to similar subject matter as the instant application, are assigned in common with the instant application and are incorporated herein by reference as if the texts thereof were fully set forth herein.

BACKGROUND OF THE INVENTION

1. Field of the Invention

The present invention relates to an adjustable shock absorber, particularly for use with motor vehicles, which includes a cylinder containing damping fluid, a piston rod which projects into the cylinder in a sealed manner and moves axially, and a piston attached to the piston rod and dividing the cylinder into two working chambers, the shock absorber being provided with at least one passage producing a damping force, the effective cross section of which can be adjusted by a throttle valve.

2. Description of the Prior Art

German Laid Open Patent Application DE-OS No. 21 19 531 relates to a hydraulic adjustable shock absorber well known in the prior art in which there is a first damping element, plus a line equipped with a control valve. There is also a control valve and a damping element in a closed circuit, always separately located. The control valve is set manually or by the action of one of the vehicle mechanisms. One disadvantage of devices of this type is that they are difficult to manufacture from a production engineering point of view, due to the line and due to the components being arranged in series. Additionally, the mechanical activation produces a certain damping force, such that reliable variability in the different damping characteristics cannot be achieved.

German Patent Publication Published for Opposition Purposes DE-AS No. 12 42 945 relates to another hydraulic shock absorber well known in the prior art, the damping characteristics of which can be adjusted by changing the flow of the hydraulic damping medium electromagnetically by means of a damping valve. In this device, there are two bypass connections, the first of which is generally used to regulate the damping force in the decompression stage, as opposed to the compression stage. A disadvantage of this configuration is that there is no provision for regulating the compression stage, and such a regulation is not possible in this design.

German Laid Open Patent Application DE-OS No. 33 34 704 relates to known prior art shock absorbers having a control apparatus to regulate the damping valves in the damping piston. By means of an electromagnetic drive, a return force is produced on the throttle valve. Additionally, there is a supporting hydraulic compensation apparatus reinforcing this return force. A disadvantage of this configuration is that the force produced by the fluid pressure is not applied directly to the throttle element, but via a supporting body, necessitating a seal, which produces friction and which, therefore, interferes with the opening and closing action of the valve, or else produces a significant oil leakage flow.

All of the aforementioned patents are incorporated by reference as if the entire contents thereof were fully set forth herein.

OBJECTS OF THE INVENTION

A principal object of the present invention is the provision, in an adjustable hydraulic shock absorber, of a simple control apparatus which can be used to control the damping force, and which exhibits an opening and closing action free of friction and, therefore, free of hysteresis and oil leakage losses, and which consumes a reduced amount of control energy.

A further object of the invention is the provision of an adjustable shock absorber having a high switching speed and which does not exhibit the effects of hysteresis.

A still further object of the invention is the provision of an adjustable shock absorber having a continuous and reproducible control characteristic and provided with a valve which exhibits precisely defined opening characteristics.

An even further object of the invention is the provision of such an adjustable shock absorber having a control system contained within the damping piston.

SUMMARY OF THE INVENTION

This object is achieved through the provision of a bypass, which includes an actuator mechanism controlling a passage in which a flexible membrane is housed in a chamber, such that, on one side of the membrane, at least one inflow hole and at least one discharge hole of the passage can be closed off from one another by the membrane and a control edge (or valve seat) interacting with the membrane, and that on the opposite side of the membrane, a control chamber is formed which is sealed off from the passage and which forms a portion of a control bypass.

One advantage of this configuration is that a pilot valve is used to control and regulate the damping medium, which valve has a self-supplied pilot stage. The pressure difference which produces the damping force is thereby used in the chambers for the adjustment of the damping force.

The membrane of the valve, as a result of its prestress and spring constant, and as a result of the surface and pressure ratios on the two sides of the membrane, assumes precisely defined opening distances with respect to the control edge (or valve seat). Another advantage is that, due to the low weight of the membrane, high switching speeds can be achieved, and the elimination of seal friction and a hysteresis-free opening and closing action becomes possible, along with a simultaneous elimination of oil leakage losses. Moreover, the presence of the membrane not only makes possible the open and closed positions, but also, a continuous and reproducible control characteristic.

These advantages are achieved by the membrane which is placed in the chamber so that on one side of the membrane, at least one inflow hole and at least one discharge hole of the passage can be closed off from one another by means of the membrane and a control edge (or valve seat) interacting with the membrane, and that on the other side of the membrane, a control chamber is formed which carries the control bypass flow and is sealed off from the passage.

A pressure within the limits determined by the pressures in the working chambers can be set in this control chamber by controlling the quantity of damping medium flowing in and/or out. Consequently, a force which determines the opening characteristic of the valve is exerted on the valve membrane over the pressurized surface of the valve. The difference pressure acting on the membrane is produced because an annular surface on the one side of the membrane is pressurized by the pressure from the inflow holes, and starting at the control chamber, the control bypass pressurizes the entire membrane on the opposite side. Depending on the position of the actuator mechanism, a relatively high pressure then builds up in the control chamber, so that when the membrane separates from the control edge, there is a connection between the inflow holes and the discharge holes.

According to another feature of the invention, the passage is a bypass connecting the working chambers, or the passage is formed by equipping each of the holes of the piston in the decompression and/or compression stage with a throttle valve. An advantage here is that the system can be used in the damping piston itself or, with the assistance of a bypass and the corresponding control bypass, as a connection of the two working chambers in a one-tube shock absorber or of one working chamber and the equalization chamber in a two-tube shock absorber.

A particularly favorable embodiment provides that at least a portion of the control bypass exhibits a cross section which is smaller than the cross section of all the inflow holes of the passage. An advantage of this embodiment is that the reduced cross section of the control bypass admits only the quantity of fluid necessary to increase the control pressure in the chamber, and the remaining volume of the damping medium must all flow via the passage.

To vary the pressure in the control chamber, an adjustable valve is provided as an actuator mechanism. Well known pressure regulators of the prior art, such as proportional valves or several miniaturized 2/2-way valves or timed and pulse-width-modulated 2/2-way valves, can be used.

Preferably, the membrane is at least one metal disc, which is clamped in the middle. The membrane can also be advantageously supported in the central portion on the side opposite the control chamber. In one embodiment, the metal disc is prestressed. The membrane thereby seals the chambers off from one another, and as a result of the contact with the control edge (or valve seat), different annular surfaces pressurized by different pressures are formed. In addition, the axial prestress of the metal disc itself is used to set the variable opening action.

Advantageously, it is possible to determine the force-velocity characteristic of the shock absorber by means of the throttle cross section, i.e., the axial distance which the membrane separates from the control edge (or valve seat).

In addition to the diameter ratios of the control edge and outside diameter of the membrane, which are determined by the design, the precise adjustment capabilities of the pressure ratio between the pressure in the inflow hole and the pressure in the control chamber can also be varied accordingly, along with the spring constant of the elastic membrane appropriate to the characteristic of the damping force adjustment required.

The ratio of the control pressure in the control chamber to the damping pressure can be determined by varying the surface ratio of the inflow cross section to the discharge cross section of the actuator mechanism to a value between 1 and 0. It is practically inconsequential for the control action of the valve whether the adjustment of the discharge cross section is made by an analogous adjustment or, at a correspondingly higher activation frequency, by a temporal adjustment, e.g., opening and closing periods of different lengths.

In one embodiment, a perfect seal on the outside edge of the metal disc, as well as a corresponding adjustment of the prestress, is achieved by axially prestressing the outer periphery of the metal disc. In such case, bilateral pressurization of the metal disc causes it to separate from the control edge (or valve seat) by a defined axial distance. The opening cross section and the opening point of the metal disc are thereby determined to achieve the connection of the inflow and discharge hole.

In another embodiment of the invention, two membranes border a common control chamber. Here, for example, the system can be installed in the piston, so that the passages of the decompression and compression stages can be controlled simultaneously.

In yet another embodiment, the bypass, the control bypass and the actuator mechanism are integrated in a separate component disposed adjacent to the working chambers.

Still yet another embodiment of the invention resides broadly in an adjustable shock absorber which comprises: a sealed cylinder containing a damping fluid; a piston rod sealingly projecting into the cylinder and axially displaceable with respect thereto: a piston attached to the piston rod and disposed within the cylinder to thereby sealingly divide the cylinder into first and second chambers; a flexible membrane having first and second sides; a valve seat disposed adjacent the first side of the flexible membrane; a principal bypass hydraulically interconnecting the first and second chambers and passing between the first side of the flexible membrane and the valve seat; and a control bypass hydraulically interconnecting the first and second chambers with the second side of the flexible membrane.

DESCRIPTION OF THE PREFERRED EMBODIMENTS

Figure 1:
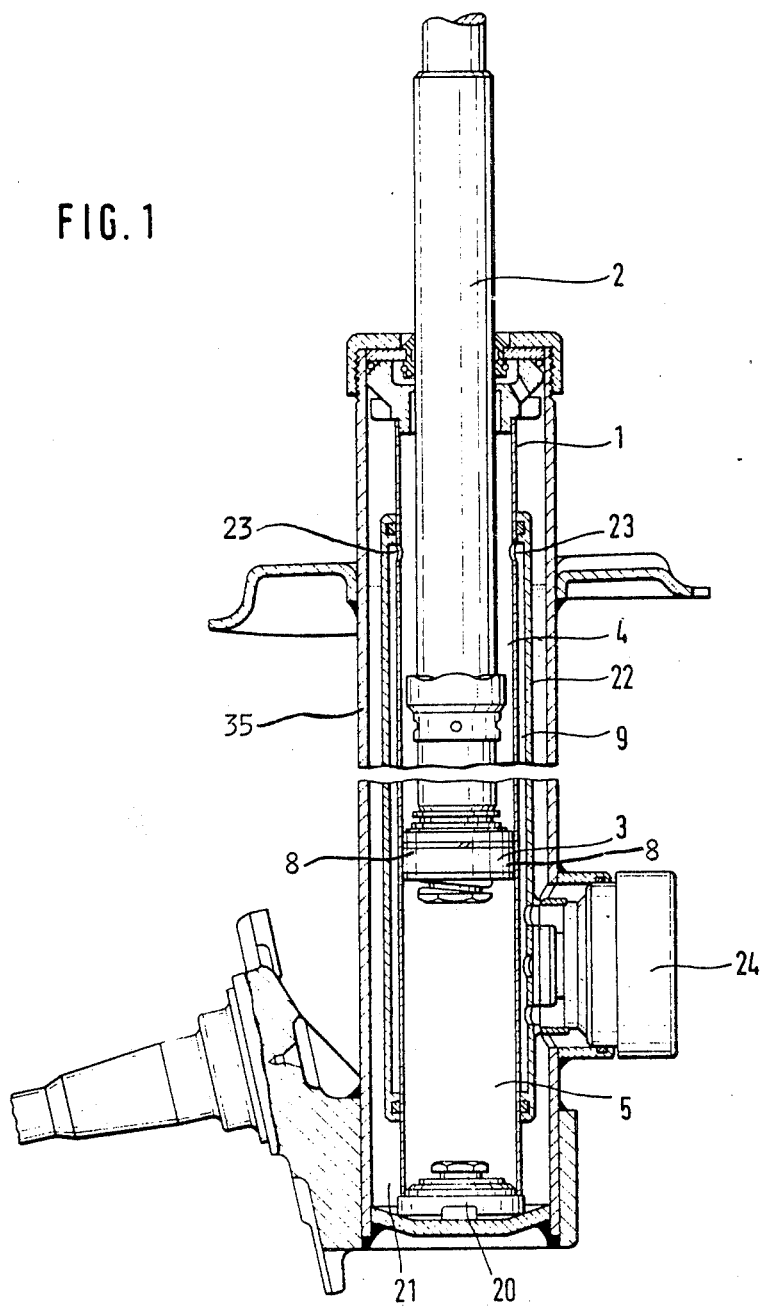
FIG. 1 is a cross-sectional view of a two-tube shock absorber with a control system located in a separate component.

Referring first to FIG. 1, an adjustable two-tube shock absorber generally includes a cylinder 1, which sealingly contains a hydraulic fluid, a piston rod 2, which sealingly projects into cylinder 1 and is axially displaceable with respect thereto, and a damping piston 3, sealingly disposed within cylinder 1 and connected to piston rod 2. Piston rod 2 is attached to a structure portion, e.g., of a vehicle, which is not shown. Piston 3 divides cylinder 1 into upper and lower working chambers 4 and 5, respectively, and is provided with axially throughgoing passages and associated throttle valves 8 of conventional design and well known in the art, which provide a substantially constant and non-variable resistance to the axial displacement of piston 3 and piston rod 2.

Two additional cylinders of progressively greater diameter 22 and 35 are disposed coaxially with and so as to surround cylinder 1, thereby providing two additional annular chambers, a bypass chamber 9 and an equalization chamber 21. Bypass chamber 9 interconnects with the working chambers via orifices 23, and a valve 20, located at the bottom of cylinder 1, provides a means by which the damping medium contained therein can reach equalization chamber 21.

A damping force control unit 24, which acts hydraulically in parallel with throttle valves 8 to modify the substantially constant damping force which throttle valves 8 provide, is mounted as a separate component attached to the shock absorber and is in fluid communication with bypass 9 and equalization chamber 21.

Figure 2:
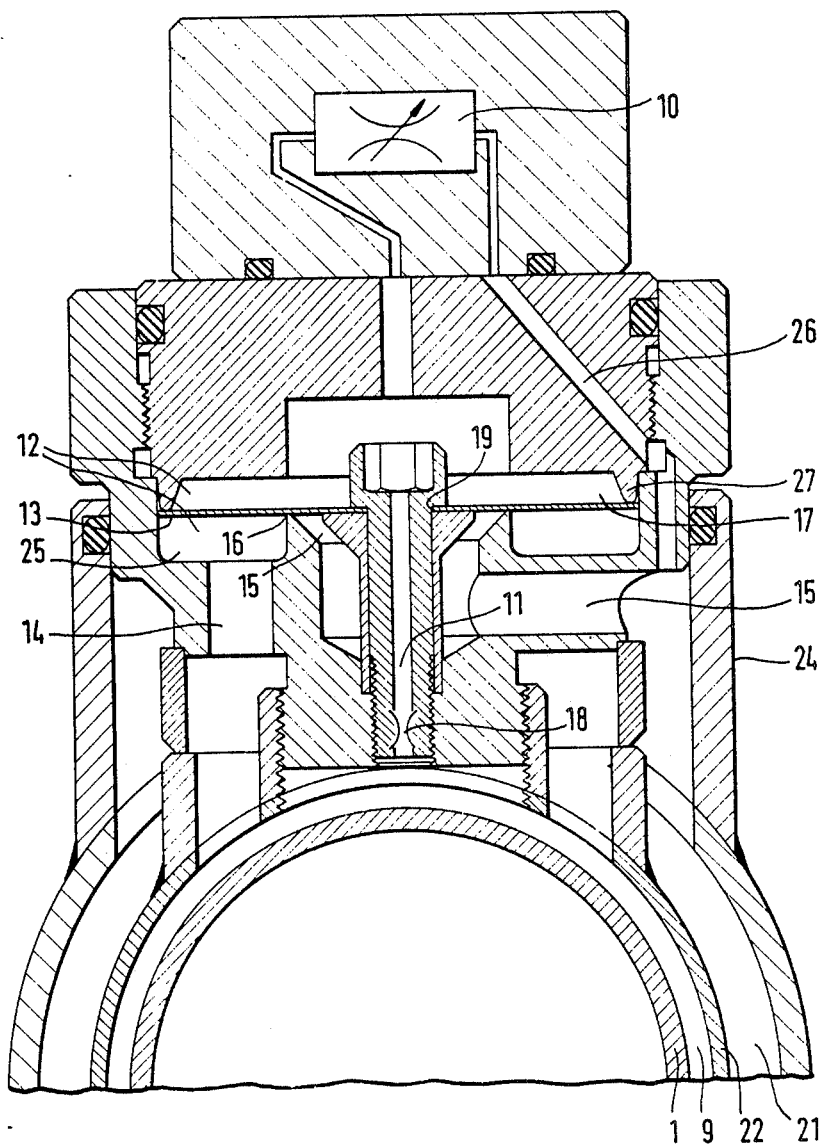
FIG. 2 is a cross-sectional view of the control system of FIG. 1.

Referring now to FIG. 2, control unit 24 generally includes a bypass chamber 12 divided by a flexible membrane 13 into a control chamber 17 and a controlled chamber 25, a valve seat (or control edge) 16 disposed adjacent a first side of membrane 13, a fluid flow control valve (or fluid flow control means) 10 and associated passages as follows:

A principal fluid flow bypass is generally defined by a first passageway 14 leading from bypasschamber 9 to the first (or lower) side of membrane 13, thence between membrane 13 and valve seat 16, and into a passageway 15 which connects with equalization chamber 21. Additionally, a control fluid flow bypass generally includes a control bypass passageway 11 interconnecting bypass chamber 9 with control chamber 17 located on the upper (or second) side of membrane 13, thence through fluid flow control valve 10 and interconnecting passageway 26, and there merging with passageway 15 which, as noted above, is connected to equalization chamber 21.

In operation, control unit 24 functions as follows:

Upon administration of a sudden shock, a principal damping fluid flow is conducted through passageway 14 to controlled chamber 25. At the same time, a control damping fluid flow is conducted through passageway 11 to control chamber 17. With appropriate construction of membrane 13 and detailing of the various passageways, as explained in more detail below, membrane 13 remains in contact with valve seat 16, and thus, the principal damping fluid flow is blocked from proceeding beyond controlled chamber 25.

However, control damping fluid may still flow from control chamber 17 through fluid control valve 10 and passageways 26 and 15 to equalization chamber 21. If sufficient fluid passes through valve 10, disproportionate pressure forces acting on membrane 13 will cause membrane 13 to move away from valve seat 16, thus allowing a principal fluid flow from chamber 25, between membrane 13 and valve seat 16, through passageway 15, and thence into equalization chamber 21.

It will be appreciated that the point at which membrane 13 may be caused to move away from valve seat 16 under the action of unbalanced forces may be influenced by a number of factors. As shown in FIG. 2, the surface area on the lower (or first) side of membrane 13 exposed to the principal damping fluid flow by chamber 25 may be significantly less than the surface area of the upper (or second) side of membrane 13 exposed to the control fluid flow. Additionally, the fluid pressure in control chamber 17, tending to maintain membrane 13 and valve 16 in a closed position, may be significantly relieved via control valve 10. Moreover, passageway 11 may be provided with a portion of reduced cross section 18 which serves to ensure that only the quantity of damping fluid necessary to control membrane 13 reaches control chamber 17. Even further, control membrane 13 may be prestressed in an axial direction, as, for example, through the use of a central clamping mechanism, as shown in FIG. 2, or through the use of a circumferential clamping collar 27, also shown in FIG. 2.

Whereas the present invention contemplates that fluid control valve 10 may consist of merely an appropriate dimensioning of the control fluid passageways, control valve 10 is preferably at least an on-off fluid flow control mechanism. Even more preferably, fluid valve 10 is a selectively variable fluid flow control mechanism, as for example, a type of flow regulator well known in the prior art, such as a proportional valve or at least one miniaturized two/two-way valve or at least one timed and/or pulse-width-modulated two/two-way valve.

Preferably, in the present embodiment, membrane 13 is a prestressed metal disc, firmly clamped in its central region 19 and having an axial prestress applied thereto via collar 27.

Figure 3:
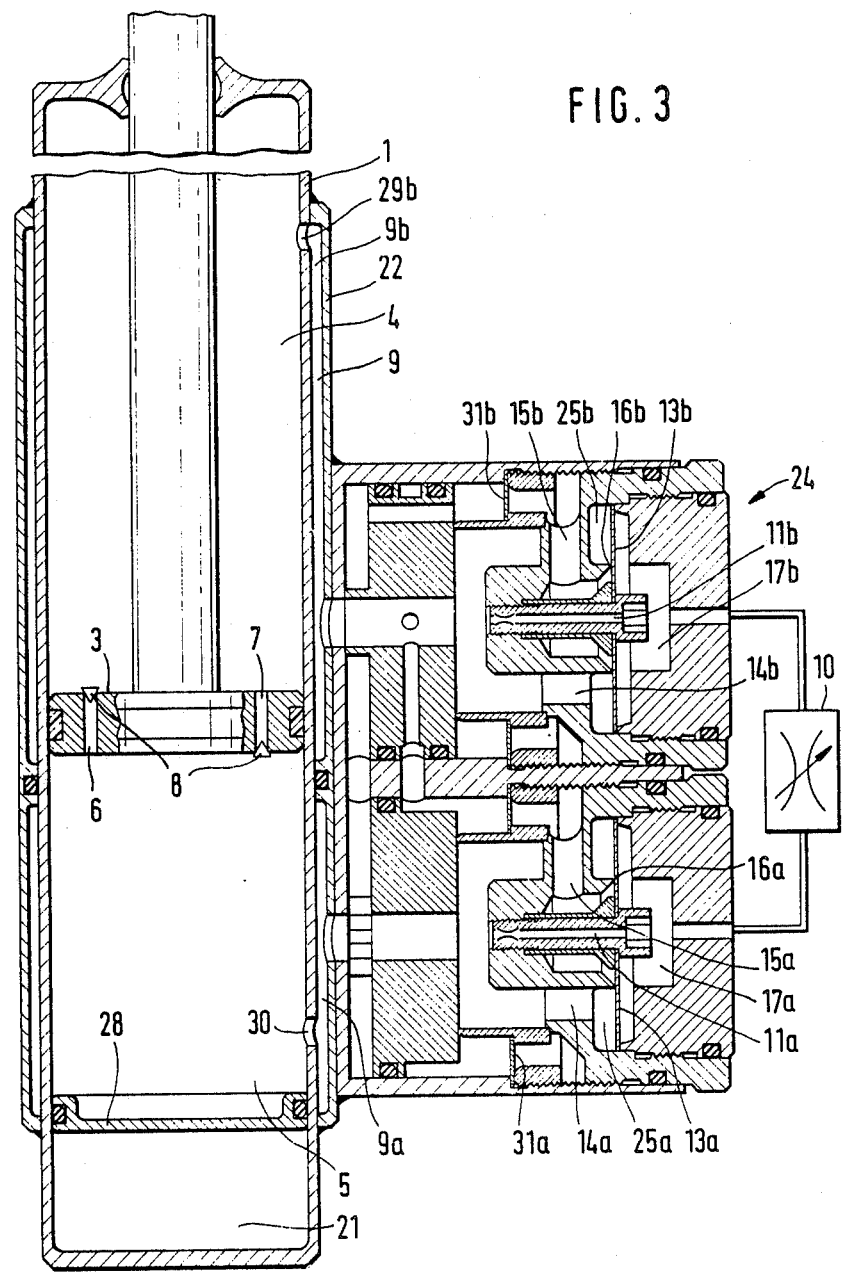
FIG. 3 is a cross-sectional view of a one-tube shock absorber with two control systems which are controlled by a common actuator mechanism.

Referring now to FIG. 3, showing a one tube shock absorber provided with a bypass control unit according to the invention, a cylinder 1 is divided by means of a separating piston 28 from an equalization chamber 21 which is filled with a compressible gas. Another cylinder of larger diameter 22 is disposed coaxially with cylinder 1 so as to form a bypass chamber 9, which includes two bypass passages 9a and 9b which communicate with each other through bypass control unit 24, bypass passages 9a and 9b communicating with the upper and lower working chambers 4 and 5 through orifices 29b and 30, respectively.

Control unit 24 includes two separate flexible membranes, 13a and 13b, which are controlled through a common fluid flow control valve 10. In this particular embodiment of the invention, one of membranes 13a and 13b controls the flow of damping fluid during a compression stroke of the shock absorber, while the other membrane controls the flow of damping fluid during a decompression stroke.

During a compression stroke, damping fluid passes via orifice 30 into bypass passage 9a and thence through passage 14a into annular controlled chamber 25a, there exerting a pressure on the lower or first side of membrane 13a. A check valve 31a is at this point closed. Damping fluid also flows from passageway 9a through control passage 11a into control chamber 17a, to thereby exert a pressure on the upper or second side of membrane 13a tending to urge it towards and in contact with valve seat 16a. Dependent upon the state of control valve 10, damping fluid may flow through control valve 10, control passage 11b and bypass passageway 9b, into upper working chamber 4.

If the pressure in control chamber 17a drops sufficiently, membrane 13a will separate from valve seat 16a, thus permitting a principal flow of damping fluid past valve seat 16a, through discharge passage 15a and passageway 9b and, ultimately, into upper working chamber 4.

In contrast, during a decompression stroke, damping fluid flows from upper working chamber 4 through bypass passageway 9b and passageway 14b to controlled chamber 25b to there pressurize the lower or first side of membrane 13b. Additionally, damping fluid flows through control passage 11b and into control chamber 17b to pressurize membrane 13b on its upper or second side. A check valve 31b is, at this point, closed.

Dependent upon the state of control valve 10, damping fluid may then flow through valve 10, passageway 11a and bypass passageway 9a into lower working chamber 5. If the fluid pressure in control chamber 17b drops sufficiently, membrane 13b will separate from valve seat 16b, thus allowing a primary flow of damping fluid to move over valve seat 16b, through discharge passage 15b, check valve 31b and bypass 9a, and into lower working chamber 5. The connection between check valve 31b and bypass 9a may be, as shown, via an annular passageway provided in the base of control unit 24, or may be via alternate routes well known in the art.

Thus, it will be seen that during both the compression and decompression strokes, there may be a modification of the substantially constant damping resistance provided by throttle valves 8 provided in piston 3.

Figure 4:
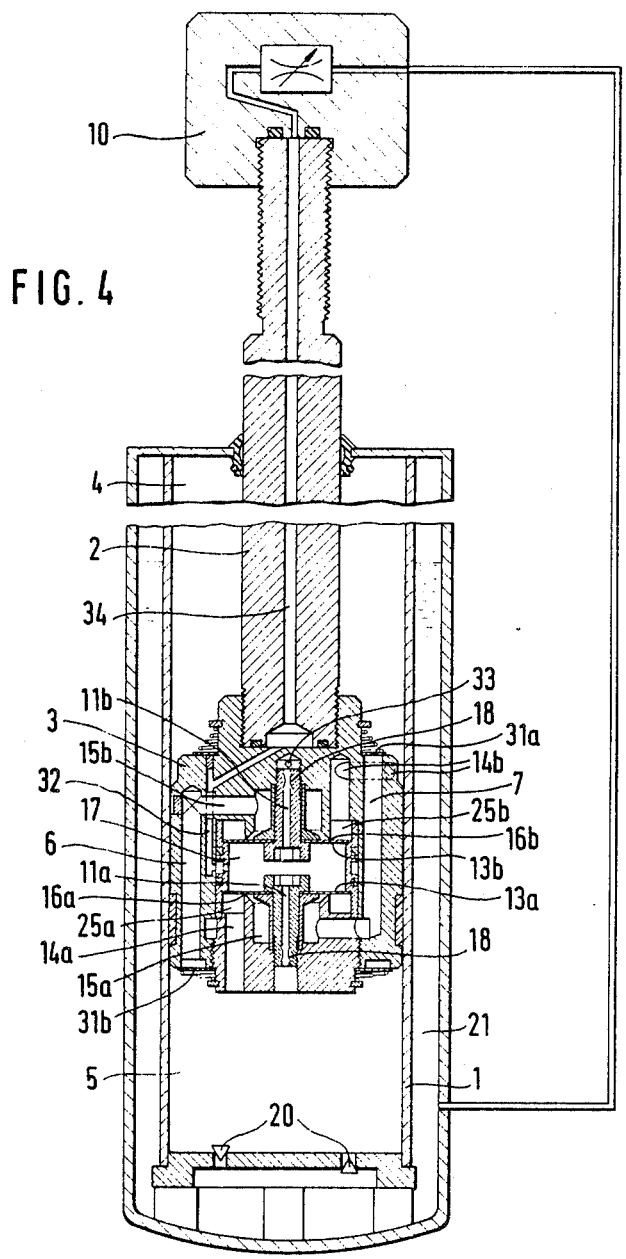
FIG. 4 is a cross-sectional view of an embodiment wherein a control system is located in the damping piston of a two-tube shock absorber and wherein two control systems share a common control chamber.

In FIG. 4, there is shown a two-tube shock absorber, having a variable damping mechanism mounted within te working piston, and wherein a pair of bottom valves 20 provide a hydraulic connection between a lower working chamber 5 and an equalization chamber 21.

A piston 3 divides cylinder 1 into an upper working chamber 4 and a lower working chamber 5 and is attached to a piston rod 2 which projects outside cylinder 1 and is attached to a structural portion, e.g., of a vehicle. Piston 3 is provided with passages 6 and 7 which are provided with associated check valves 31b and 31a, respectively. In the embodiment of FIG. 4, the throttling of the damping fluid between the working chambers is effected only by membranes 13a and 13b and their associated valve seats 16a and 16b.

During a compression stroke, damping fluid flows via passage 14a into controlled chamber 25a to pressurize a first side of membrane 13a and at the same time, via control passage 11a into control chamber 17 to pressurize a second side of membrane 13a. If fluid control valve 10 is closed and if the constricted prethrottle regions 18 are identical in control passages 11a and 11b, the resulting pressure in control chamber 17 is one-half the pressure in controlled chamber 25a. By appropriate proportioning of the diameters of valve seat 16 and collar 27, membrane 13a will be in contact with valve seats 16a, independently of the pressure in controlled chamber 25a. Thus, the primary flow of damping fluid will be closed off from discharge passageway 15a.

If fluid control valve 10 is more or less in an open position, control damping fluid can flow out partly through control passage 11b and hole 33 into upper working chamber 4, and partly via passages 32 and 34 and fluid control valve 10 into equalization chamber 21. With a sufficient pressure drop in control chamber 17, membrane 13a separates from valve seat 16a, such that aprincipal flow of damping fluid may pass through passage 15a and passage 7 and, thence, through check valve 31a and into upper working chamber 4.

During a decompression stroke, damping fluid flows through inflow passage 14b to enter controlled chamber 25b and there pressurize a first side of membrane 13b. Damping fluid also enters hole 33 and travels via bypass passage 11b to control chamber 17 to thereby pressurize the second side of membrane 13b. From control chamber 17, control damping fluid again travels through passages 32 and 34, through fluid control valve 10 and into equalization chamber 21, as well as, through bypass passage 11a and into lower working chamber 5.

In the embodiment of FIG. 4, control passages 11a and 11b are again preferably provided with a constricted portion 18 of reduced cross sectional area, the diameter of the control passages 11a and 11b being smaller than that of the inflow passages 14. Constricted portions 18 permit passage of only that fraction of the damping fluid necessary to control membranes 13a and 13b. The remainder of the damping fluid must (i.e., the principal fluid flow), therefore, pass through the throttle point between the membranes 13a and 13b and the respective valve seats 16a and 16b.

Figure 5:
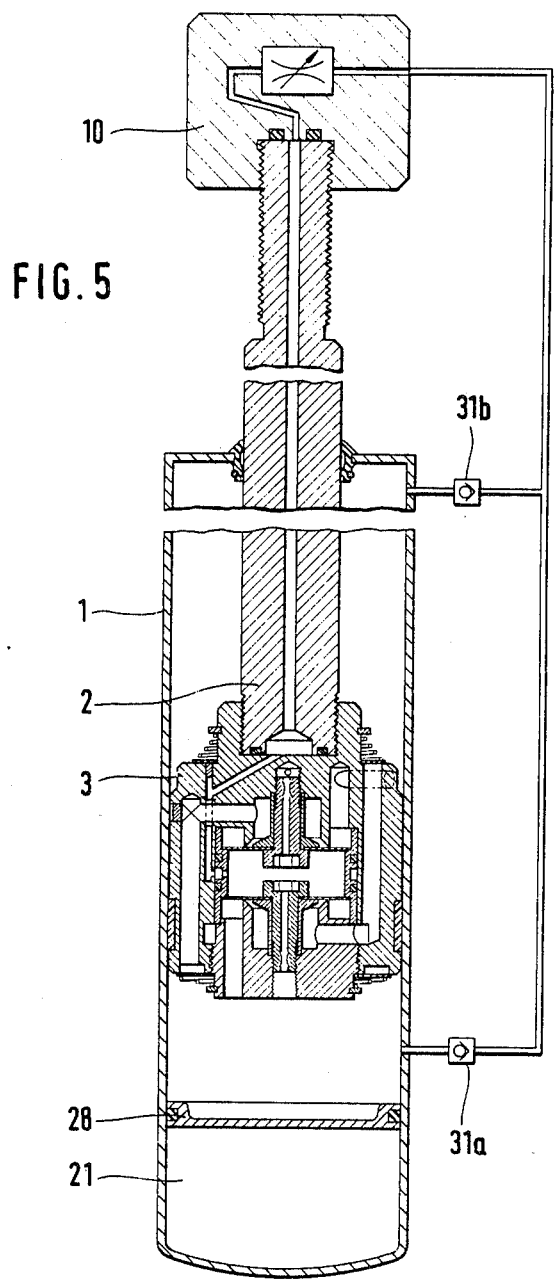
FIG. 5 is a cross-sectional view of another embodiment wherein a control system is located in the damping piston of a one-tube shock absorber and wherein two control systems share a common control chamber.

In FIG. 5, there is shown an embodiment wherein an equalization chamber 21 is formed adjacent cylinder 1 by means of a separating piston 28. The principal of operation of the damping piston 3 in FIG. 5 is the same as that of FIG. 4, set forth above. For operation of the FIG. 5 embodiment, all that is additionally necessary is the provision of a check valve 31a for the compression stroke and a check valve 31b for the decompression stroke, insuring that fluid control valve 10 cannot be pressurized in a reverse direction. Otherwise, the operation of membranes 13a and 13b in FIG. 5 is identical to that described above, with respect to the embodiment of FIG. 4.

The invention as described hereinabove in the context of the preferred embodiments is not to be taken as limited to all of the provided details thereof, since modifications and variations thereof may be made without departing from the spirit and scope of the invention.

What is claimed is:

1. An adjustable shock absorber, comprising:
   a sealed cylinder containing a damping fluid;
   a piston rod sealingly projecting into said cylinder and axially displaceable with respect thereto;
   a piston attached to said piston rod and disposed within said cylinder to thereby sealingly divide said cylinder into first and second chambers;
   a wholly mechanical throttle valve connecting said first and second chamber for varying the damping of said adjustable shock absorber;
   said wholly mechanical throttle valve comprising:
   a flexible membrane having a first side, a second side, an inner portion and an outer peripheral portion;
   means for prestressing said membrane;
   a valve seat disposed adjacent said first side of said flexible membrane;
   a first passageway for admitting fluid on one side of said valve seat; and a second passageway for expelling fluid on another side of said valve seat,
   said valve seat comprising an edge between said first passageway and said second passageway;
   a control chamber disposed at said second side of said membrane; a controlled chamber disposed at said first side of said membrane; a principal bypass interconnecting said first and second chambers through said first and second passageways and said controlled chamber; and
   continuously open, internal bypass means for connecting said control chamber with said first passageway, for admitting fluid, to pressurize said control chamber;
   said shock absorber further comprising:
   control bypass means, external to said wholly mechanical throttle valve, connecting aid second passageway, for expelling fluid, with said control chamber.

2. The shock absorber according to claim 1, wherein said control bypass means further comprises fluid valve means for altering the flow of damping fluid through said control bypass means.

3. The shock absorber according to claim 2, wherein said fluid valve means comprises a selectively variable valve.

4. The shock absorber according to claim 3, further comprising an additional membrane, an additional controlled chamber, an additional principal bypass and an additional valve seat, and wherein said second sides of said two membranes face a common control chamber.

5. The shock absorber according to claim 1, further comprising check valve means interposed between selectively variable valve and at least one of said first and second chambers for preventing reverse pressurization of said selectively variable valve.

6. The shock absorber according to claim 2, further comprising an additional membrane, an additional controlled chamber, an additional principal bypass and an additional valve seat, and wherein said second sides of said two membranes face a common control chamber.

7. The shock absorber according to claim 6, further comprising check valve means interposed between said fluid valve means and at least one of said first and second chambers for preventing reverse pressurization of said fluid valve means.

8. The shock absorber according to claim 1, wherein said membrane comprises a metal disc.

9. The shock absorber according to claim 8, further comprising central clamping means for tightly clamping a central region of said metal disc.

10. The shock absorber according to claim 8, further comprising prestress means for axially prestressing said metal disc such that application of force thereon causes a portion of said metal disc to bend away from the plane coincident with the edge of said valve seat.

11. The shock absorber according to claim 1, further comprising at least one throttle valve interconnecting said first and second chambers hydraulically in parallel with said principal bypass.

12. The shock absorber according to claim 1, wherein said means for prestressing said membrane comprises means for making contact with said inner portion and said outer peripheral portion of said membrane.

13. The shock absorber according to claim 1, further comprising central clamping means for tightly clamping a central region of said membrane.

14. The shock absorber according to claim 13, including a membrane support and wherein said central region of said membrane is tightly clamped to said membrane support.

15. The shock absorber according to claim 1, further comprising:
   a check valve interposed in said control bypass means;
   a second flexible membrane;
   a second principal bypass;
   a second control bypass means; and
   a second check valve interposed in said second control bypass means; and
   wherein said first and second control bypass means are hydraulically interconnected.

16. The shock absorber according to claim 15, further comprising central clamping means for tightly clamping a central region of at least one of said membranes.

17. The shock absorber according to claim 16, further comprising a membrane support formed in said controlled chamber and wherein said central region of said at least one membrane is tightly clamped to said membrane support.

18. The shock absorber according to claim 15, further comprising fluid valve means interposed between said first and second control bypass means for altering the flow of damping fluid therebetween.

19. The shock absorber according to claim 18, wherein said fluid valve means comprises a selectively variable valve.

20. The shock absorber according to claim 18, further comprising a pre-throttle constriction in the internal bypass means connecting to one of said control bypass means, said pre-throttle constriction having a cross-sectional area which is less than the portion of said respective principal bypass interconnecting one of said first and second chambers with said controlled chamber.

21. The shock absorber according to claim 18, further comprising at least one throttle valve interconnecting said first and second chambers hydraulically in parallel with said principal bypass.

22. The shock absorber according to claim 18, wherein at least one of said membranes comprises a metal disc.

23. The shock absorber according to claim 22, further comprising prestress means for axially prestressing said metal disc such that application of force thereon causes a portion of said metal disc to bend away from the plane coincident with the edge of said valve seat.

24. The shock absorber according to claim 22, further comprising central clamping means for tightly clamping a central region of said metal disc.

25. The shock absorber according to claim 22, wherein said metal disc is a prestressed metal disc.

26. The shock absorber according to claim 25, further comprising central clamping means for tightly clamping a central region of said metal disc.

27. The shock absorber according to claim 1, including a controlled chamber disposed at said first side of said membrane; a principal bypass interconnecting said first and second chambers through said first and second passageways and said controlled chamber.

28. The shock absorber according to claim 27, further comprising a pre-throttle constriction in said internal bypass means, said pre-throttle constriction having a cross-sectional area which is less than the portion of said principal bypass interconnecting one of said first and second chambers with said controlled chamber.

29. The shock absorber according to claim 27, further comprising an additional membrane, an additional controlled chamber, an additional principal bypass and an additional valve seat, and wherein said second sides of said two membranes face a common control chamber.

* * * * *